(12) United States Patent
Russoniello et al.

(10) Patent No.: US 8,633,981 B2
(45) Date of Patent: Jan. 21, 2014

(54) WIRELESS CONTROLLED PET TOY DISPENSER WITH CAMERA

(76) Inventors: Christina R. Russoniello, Asbury, NJ (US); Laurie E. Stone, Milford, NJ (US)

( * ) Notice: Subject to any disclaimer, the term of this patent is extended or adjusted under 35 U.S.C. 154(b) by 831 days.

(21) Appl. No.: 12/460,720

(22) Filed: Jul. 23, 2009

(65) Prior Publication Data

US 2011/0018994 A1    Jan. 27, 2011

(51) Int. Cl.
    *H04N 7/18*    (2006.01)
(52) U.S. Cl.
    USPC .......................................... 348/114; 348/143
(58) Field of Classification Search
    USPC .......................................... 348/154, 114, 143
    See application file for complete search history.

(56) References Cited

U.S. PATENT DOCUMENTS

| | | | |
|---|---|---|---|
| 6,273,027 B1 | 8/2001 | Watson et al. | |
| 6,773,344 B1 | 8/2004 | Gabai et al. | |
| 7,263,953 B2 | 9/2007 | Sundararajan | |
| 7,328,671 B2 | 2/2008 | Kates | |
| 7,380,518 B2 | 6/2008 | Kates | |
| 7,409,924 B2 | 8/2008 | Kates | |
| 7,424,867 B2 | 9/2008 | Kates | |
| 7,434,541 B2 | 10/2008 | Kates | |
| 7,584,720 B1 * | 9/2009 | Jackson | 119/472 |
| 2006/0011144 A1 * | 1/2006 | Kates | 119/719 |
| 2008/0223300 A1 * | 9/2008 | Kates | 119/72 |
| 2008/0282988 A1 * | 11/2008 | Bloksberg | 119/51.02 |

* cited by examiner

*Primary Examiner* — Patrice Winder
*Assistant Examiner* — Ebrahim Golabbakhsh
(74) *Attorney, Agent, or Firm* — Kenneth P. Glynn, Esq.; Deirdra M. Meagher, Esq (57) ABSTRACT

A wirelessly controlled pet toy dispenser with camera provides a user opportunity to view the user's pet from a remote location and to select a pet toy for dispensing and to select the timing of dispensing. A pet toy main housing has a plurality of compartments to hold pet toys for subsequent dispensing, each compartment having a first pet toy holding state, and having a second pet toy dispensing state; a movement mechanism connected to each of the compartments to independently move each compartment on separate command signals from the first position to the second position to dispense pet toy; controller for receiving wireless signals, including a unique signal for each of the compartments to activate the movement mechanism; camera connected to the main housing; camera transmission mechanism for wirelessly transmitting a camera picture to a remote user; a remote user transmitter and receiver, keyed to the control mechanism to permit a remote user to select a compartment and activate pet toy release at will, the receiver including camera picture screen keyed to the pet camera. In some embodiments, there is a display screen, near the pet toy main housing for a pet to see the user.

20 Claims, 6 Drawing Sheets

PET COMPONENT

Toy Dispenser
- Linear
- Vertical or Horizontal
- Array
- Circular

Mechanism

Gravity, Spring, Plunger, Gate, Tilt, Rotate, Suspend/Release

Presentation
- Video (Sending)
- Audio (Receiving)
- Two Way Video (Screen)
- Two Way Audio Features
- Central Computer Controller
- Programmable or Robotic
- History / Available Toy Reporting

WIRELESS CONTROLLED PET TOY DISPENSER WITH CAMERA

BACKGROUND OF INVENTION a. Field of Invention

The invention relates generally to a wirelessly controlled toy dispenser that will enable a user to randomly in time or at chosen times, select one or more toys from a selection of toys and automatically dispense the toy(s) to the pet. A camera connected to or in conjunction with or built into the dispenser is able to view and optionally include audio for the user to speak to the pet before and after the toy is dispensed.

b. Description of Related Art

The following patents are representative of the field pertaining to the present invention:

United States Patent No. 2006/0011144 A1 to Kates describes a computer-aided training and management system that uses a computer or other processor in wireless communication with an instrumented dog collar and/or optionally, one or more dog interaction devices. Such as, for example, video monitors, loudspeakers, video cameras, training toys (e.g., ball, bone, moving toy, etc.), an animatronics "trainer," a treat dispenser, a food dispensing and monitoring device, a water dispensing and monitoring device, tracking devices, a dog door, dog-monitoring doghouse, a dog-monitoring dog toilet, is described. In one embodiment, the instrumental dog collar is in two-way communication with a central computer system.

U.S. Pat. No. 7,434,541 B2 to Kates describes a computer-aided training and management system that uses a computer or other processor in wireless communication with an instrumented dog collar and/or optionally, one or more dog interaction devices, such as, for example, video monitors, loudspeakers, video cameras, training toys (e.g., ball, bone, moving toy, etc.), an animatronics "trainer," a treat dispenser, a food dispensing and monitoring device, a water dispensing and monitoring device, tracking devices, a dog door, dog-monitoring doghouse, a dog-monitoring dog toilet, is described. In one embodiment, the instrumented dog collar is in two-way communication with a central computer system.

U.S. Pat. No. 7,424,867 B2 to Kates describes a computer-aided training and management system that uses a computer or other processor in wireless communication with an instrumented dog collar and/or optionally, one or more dog interaction devices, such as, for example, video monitors, loudspeakers, video cameras, training toys (e.g., ball, bone, moving toy, etc.) an animatronics "trainer," a treat dispenser, a food dispensing and monitoring device, a water dispensing and monitoring device, tracking devices, a dog door, dog-monitoring doghouse, a dog-monitoring dog toilet, is described. In one embodiment, the instrumented dog collar is in two-way communication with a central computer system.

U.S. Pat. No. 7,409,924 B2 to Kates describes a computer-aided training and management system that uses a computer or other processor in wireless communication with an instrumented dog collar and/or optionally, one or more dog interaction devices, such as, for example, video monitors, loudspeakers, video cameras, training toys (e.g., ball, bone, moving toy, etc.) an animatronics "trainer," a treat dispenser, a food dispensing and monitoring device, a water dispensing and monitoring device, tracking devices, a dog door, dog-monitoring doghouse, a dog-monitoring dog toilet, is described. In one embodiment, the instrumented dog collar is in two-way communication with a central computer system.

U.S. Pat. No. 7,380,518 B2 to Kates describes a computer-aided training and management system that uses a computer or other processor in wireless communication with an instrumented dog collar and/or optionally, one or more dog interaction devices, such as, for example, video monitors, loudspeakers, video cameras, training toys (e.g., ball, bone, moving toy, etc.) an animatronics "trainer," a treat dispenser, a food dispensing and monitoring device, a water dispensing and monitoring device, tracking devices, a dog door, dog-monitoring doghouse, a dog-monitoring dog toilet, is described. In one embodiment, the instrumented dog collar is in two-way communication with a central computer system.

U.S. Pat. No. 7,328,671 B2 to Kates describes a computer-aided training and management system that uses a computer or other processor in wireless communication with an instrumented dog collar and/or optionally, one or more dog interaction devices, such as, for example, video monitors, loudspeakers, video cameras, training toys (e.g., ball, bone, moving toy, etc.) an animatronics "trainer," a treat dispenser, a food dispensing and monitoring device, a water dispensing and monitoring device, tracking devices, a dog door, dog-monitoring doghouse, a dog-monitoring dog toilet, is described. In one embodiment, the instrumented dog collar is in two-way communication with a central computer system.

U.S. Pat. No. 7,263,953 B2 to Sundararajan describes an integrated automatic device for training and feeding a pet, which also functions as a play mate while the owner is absent or other wise engaged. A toy holder, when actuated by an ejector, throws a toy placed therein to a predetermined distance. This toy holder is actuated by a spring connected to a spring tensioner and a rotating shaft activated by a motor programmed by microprocessors. Voice command issuer and proximity switches are provided to regulate the functioning of the device. The device is connectable to a pet feeder including a feeder capable of supplying feed for a predetermined period. The entire system is controllable by a remote control.

U.S. Pat. No. 6,773,344 B1 to Gabai et al. describes methods and apparatus for integrating interactive toys with interactive television and cellular communication systems are described. Interactive toys have real time conversations with users, preferably employing speech recognition. Interactive toys are preferably connected to at least one interactive toy server which is preferably connected to entertainment, education, sales promotion and other content providers possibly via Internet communication systems. Such a connection may utilize, for example, telephone lines, cellular communication systems, coaxial cables, satellite, DSL or other broadband systems. Interactive toys may be connected, via a wireless link, to a computing device such as a home computer, an Interactive Television set-top box or a base unit which provides Internet connectivity for the toy. Interactive toys may support mobile cellular or satellite communication. These toys are able to provide entertainment, education, sales promotion and other content to a user. Content is provided to users for their toys which enables toys to form relationship with users. Interactive Toys further utilize user knowledge bases to match entertainment, education and sales promotion content to user histories, behaviors and habits. Content is thus personalized to an individual user as well as to a user's environment including the user's location and the time at which the toy is used. Integration of content, such as entertainment, education and sales promotion is provided by merging Interactive Television techniques with Interactive Toys.

U.S. Pat. No. 6,273,027 B1 to Watson et al. describes a non-punitive, positive-reinforcement based automatically rewarding training device and a method for training an animal or patient to reduce exhibition of an undesired behavior in a caretaker's absence. The training device delivers rewards automatically at an interval of time, in response to a detected desired behavior and/or in response to a reduction or absence of an undesired behavior. The animal's general behavior is monitored with behavior detectors and one or more desired and/or undesired behaviors are targeted. An interval of time between the delivery of consecutive rewards may be modulated as a function of the targeted behaviors that are deducted.

Notwithstanding the prior art, the present invention is neither taught nor rendered obvious thereby.

SUMMARY OF INVENTION

The present invention is directed to a wirelessly controlled pet toy dispenser with camera, to provide a user with opportunity to view the user's pet from a remote location and to select a pet toy for dispensing and to select the timing of dispensing, so as to create elements of surprise in the timing and toy selection for the pet. It includes: a) a pet toy main housing having a plurality of compartments, each compartment adapted to hold at least one pet toy for subsequent dispensing, each compartment having a first state, being a pet toy holding state, and having a second state, being a pet toy dispensing state; b) movement mechanism connected to each of the plurality of compartments and adapted to independently move each of the plurality of compartments on separate command signals from the first position to the second position to dispense at least one pet toy; c) control mechanism for receiving wireless signals, including at least one unique signal for each of the plurality of compartments to activate the movement mechanism, the control mechanism being functionally connected to the movement mechanism; d) at least one pet camera connected to the main housing and camera transmission mechanism for wirelessly transmitting a camera picture to a remote user; and, e) a remote user transmitter and receiver, the transmitter keyed to the control means and adapted to permit a remote user to select a compartment and activate at least one pet toy release at will, the receiver including camera picture screen keyed to the pet camera.

In some preferred embodiments of the present invention wirelessly controlled pet toy dispenser with camera, the movement mechanisms are selected from the group consisting of (a) a latch opener with a gravity drop door; (b) a tilt mechanism; (c) a push mechanism.

In some preferred embodiments of the present invention wirelessly controlled pet toy dispenser with camera, the plurality of compartments is arranged with at least one row or column.

In some preferred embodiments of the present invention wirelessly controlled pet toy dispenser with camera, the remote user transmitter and receiver includes a microphone and said pet toy main housing includes a speaker in proximity thereto to enable a user to speak to a pet.

In some preferred embodiments of the present invention wirelessly controlled pet toy dispenser with camera, the plurality of compartments is arranged in at least one circle.

In some preferred embodiments of the present invention wirelessly controlled pet toy dispenser with camera, the remote user transmitter and receiver is a computer equipped with internet capability and picture viewing.

In some preferred embodiments of the present invention wirelessly controlled pet toy dispenser with camera, the remote user transmitter and receiver is a picture cell phone.

In some preferred embodiments of the present invention wirelessly controlled pet toy dispenser with camera, the control mechanism is a wireless receiving and transmitting microprocessor.

In some preferred embodiments of the present invention wirelessly controlled pet toy dispenser with camera, the main housing includes wall attachment mechanisms for attachment to a wall.

In some preferred embodiments of the present invention wirelessly controlled pet toy dispenser with camera, each of the plurality of compartments contains at least one pet toy and there are at least two different pet toys within the plurality of compartments.

In some other preferred embodiments of the present invention, a wirelessly controlled pet toy dispenser with camera, to provide a user with opportunity to select a pet toy for dispensing and to select the timing of dispensing so as to create elements of surprise in the timing and toy selection for a pet: a) a pet toy main housing having a plurality of compartments, each compartment adapted to hold at least one pet toy for subsequent dispensing, each compartment having a first state, being a pet toy holding state, and having a second state, being a pet toy dispensing state; b) movement means connected to each of the plurality of compartments and adapted to independently move each of the plurality of compartments on separate command signals from the first position to the second position to dispense at least one pet toy; c) control means for receiving wireless signals, including at least one unique signal for each of the plurality of compartments to activate the movement means, the control means being functionally connected to the movement means; d) at least one pet camera connected to the main housing and camera transmission means for wirelessly transmitting a camera picture to a remote user; e) a remote user transmitter and receiver, the transmitter keyed to the control means and adapted to permit a remote user to select a compartment and activate at least one pet toy release at will, the receiver including camera picture screen keyed to the pet camera; and, f) at least one display screen with audio, within proximity of the pet toy main housing to enable a pet to see and hear a remote user. Thus, these new embodiments provide for two-way viewing for the pet and the user. In some of these preferred embodiments of the present invention wirelessly controlled pet toy dispenser with camera, any or all of the additional components and features described elsewhere above in this Summary may be included.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

INCORPORATION BY REFERENCE

U.S. Pat. No. 7,434,541 B2 issued on Oct. 14, 2008 to Lawrence Kates and entitled "Training Guidance System for Canines, Felines, or Other Animals" is incorporated here in its entirety. This prior art patent establishes known methods of visual and audio communications between a user and a pet.

DETAILED DESCRIPTION OF THE EMBODIMENTS

Figure 1:
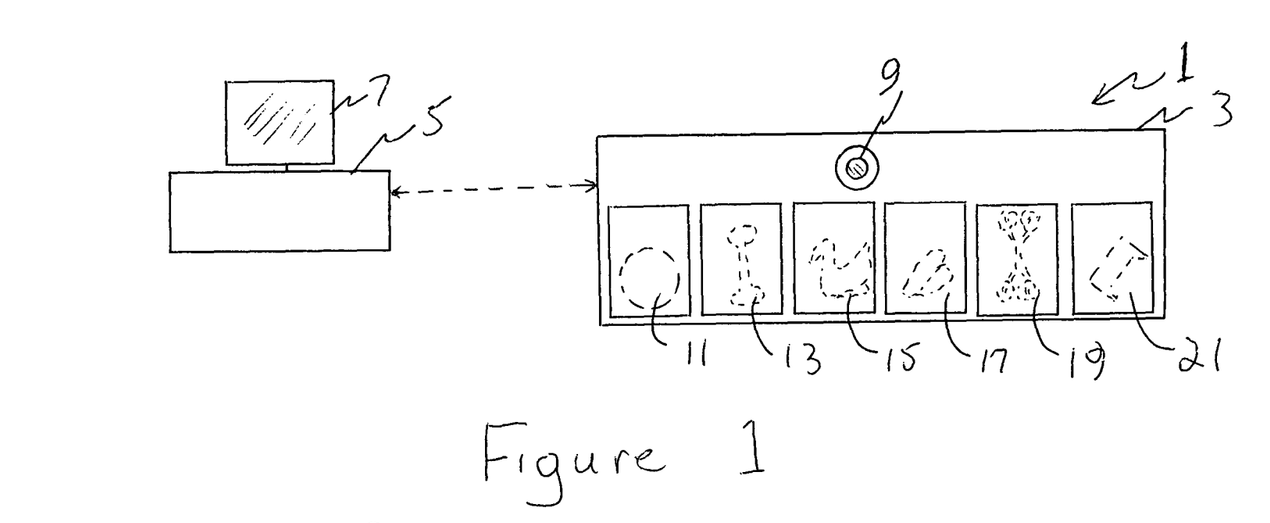
FIG. 1 is a front view of one embodiment of a wirelessly controlled pet toy dispenser with camera.

FIG. 1 is a front view of one embodiment of a wirelessly controlled pet toy dispenser with camera system I of the present invention. This present invention system I shows a pet toy dispenser main housing 3 and a remotely located, wirelessly connected user computer 5 with audio transmission and video receiving display screen 7. Main housing 3 includes a camera 9 that will wirelessly transmit the visual live image of the user's pet to user's display screen 7. Thus, the user can check on his or her pet from a remote location from time to time and decide whether or not to dispense a toy. The camera could be directed to the pet's sleeping spot or the camera could be a remote controlled rotating camera with dual axis movement. Main housing 3 includes a plurality of compartments 11, 13, 15, 17, 19 and 21. They each contain a different pet toy, as shown by the dotted lines inside each compartment.

When a user sees the pet on display screen 7 and determines that it might be a good time to dispense a toy, the user will utilize a communicator program similar to an instant messenger and by clicking the dispensing icon, for example, and then selecting the toy or compartment, the user can then click a dispense signal to release the desired toy to the pet for play activities.

Figure 2:
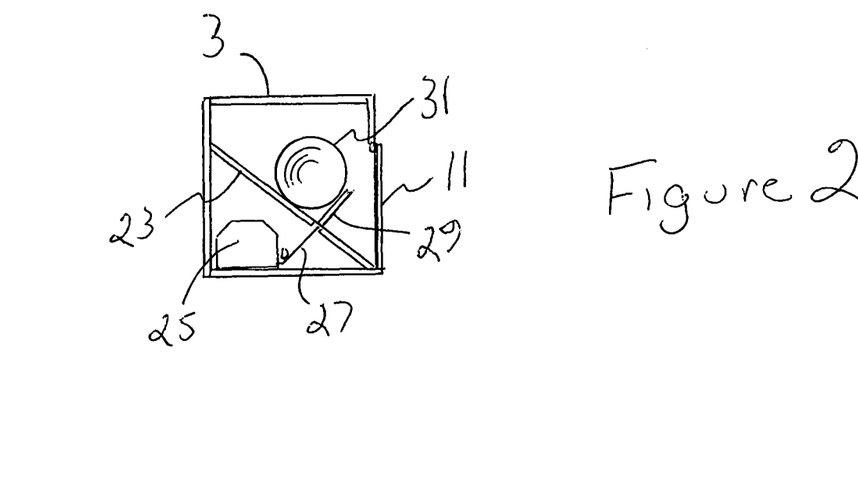
FIG. 2 is a side view of one compartment and toy of the present invention wirelessly controlled pet toy dispenser with camera shown in FIG. 1.

FIG. 2 is a side view of one compartment and toy of the present invention wirelessly controlled pet toy dispenser with camera shown in FIG. 1. This is a side, cut view of main housing 3 showing toy dispensing compartment 11. Contained within compartment 11 is a slopped base 23 with a gate 29 connected to a retractor 27 and an electronically operated retracting mechanism 25. When a user remotely and wirelessly activates retracting mechanism 25 by transmitting a unique signal, gate 29 is retracted and pet toy 3 1 (a ball) slides or rolls down slopped base 23 and the free-hanging hinged door opens to release and drop pet toy 3 1 to the pet's floor area for play.

Figure 3:
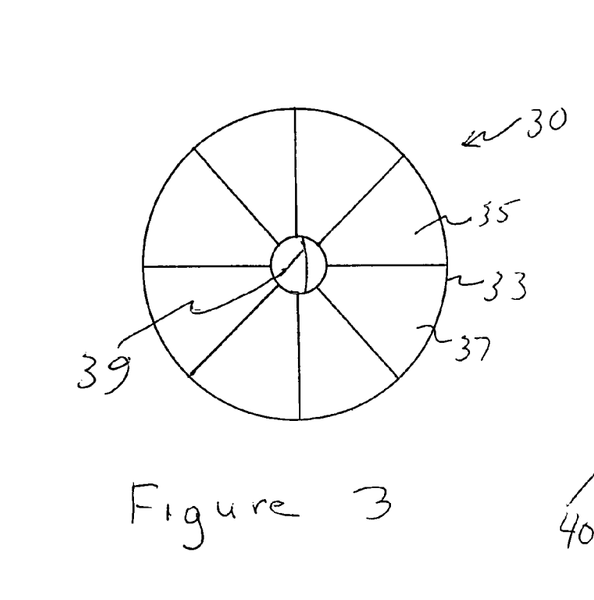
FIG. 3 illustrates front view of another embodiment of a present invention wirelessly controlled pet toy dispenser with camera toy dispenser.

FIG. 3 illustrates front view of another embodiment of a present invention wirelessly controlled pet toy dispenser with camera toy dispenser 30. In this case, the toy dispenser main housing 33 is circular and has eight compartments such as compartments 35 and 37. This is a bottom view and toy dispenser 30 could be mounted under a shelf or otherwise mounted to face the floor. Double axis camera 39 is centrally located so that a user may view live images of the pet. Each compartment will contain at least one different pet toy and may randomly be selected at random times by a remote user to open individual compartments and release desired toys. This embodiment is based on a simple gravity drop system and the compartment doors open and the individual toys just drop down to the floor area for pet play activity when selected and the compartment is activated.

Figure 4:
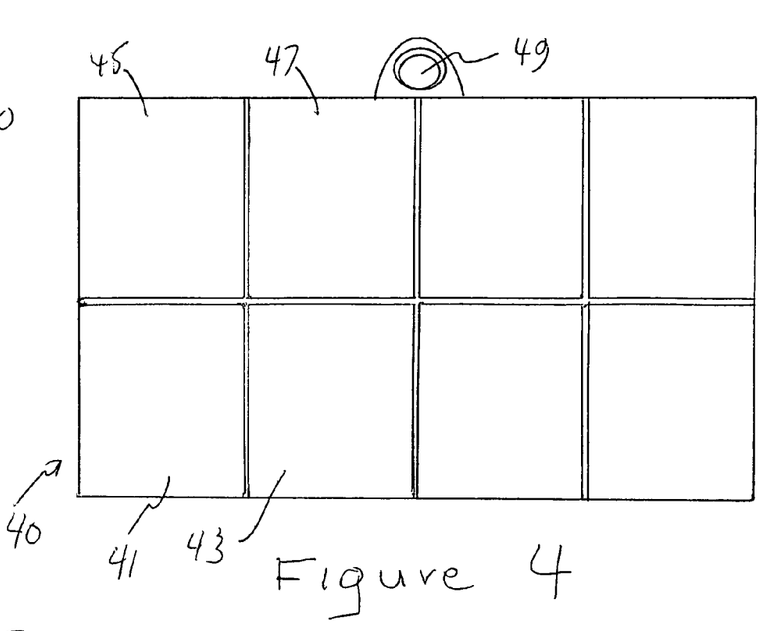
FIG. 4 illustrates front view of a third embodiment of a present invention wirelessly controlled pet toy dispenser with camera toy dispenser.

FIG. 4 illustrates front view of a third embodiment of a present invention wirelessly controlled pet toy dispenser with camera toy dispenser 40. In this embodiment, the individual toy dispensing compartments, such as compartments 41, 43, 45 and 47 are arranged in two rows with four compartments per row, as shown. Any array could be used and any user transmitter/receiver-discussed above or below. Atop the toy dispenser 40 is a moveable camera 49 to enable a user to observe a pet before, during, and after toy dispensing.

Figure 5:
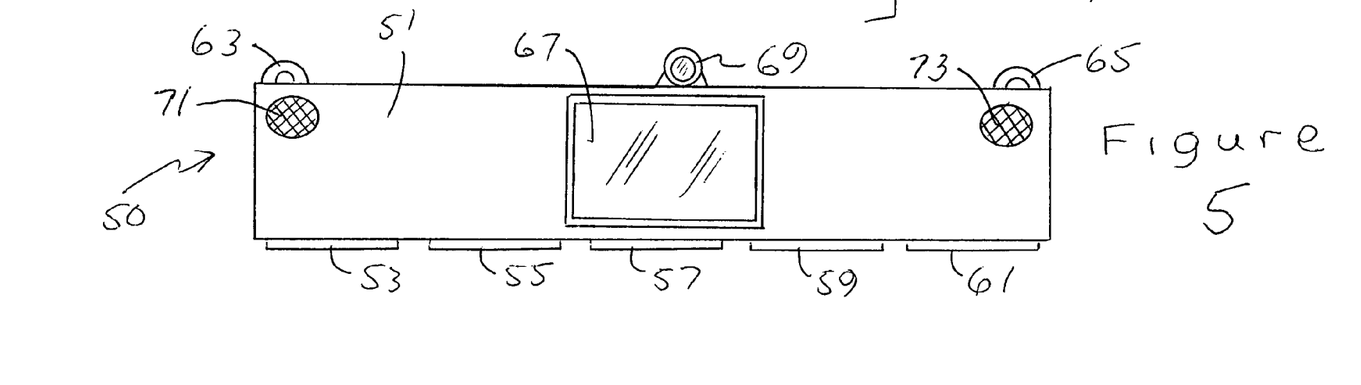
FIG. 5 illustrates a front view of a fourth embodiment of a present invention wirelessly controlled pet toy dispenser with camera pet component that provides for two-way visual and audio between the user and the pet.

FIG. 5 illustrates a front view of a fourth embodiment of a present invention wirelessly controlled pet toy dispenser with camera pet component that provides for two way visual and audio between the user and the pet. Toy dispenser 50 has a main housing 51 with gravity drop-down compartment doors 53, 55, 57, 59 and 61. Wall-mounting fixtures 63 and 65 are provided so that the unit may be attached to a wall at a height above which the pet may reach. There is a screen 67 for the pet to observe a user, as well as a camera 69 for a user to observe the pet (two-way video). There is a microphone 71 and a speaker 73 so that a user can speak to the pet and the pet can sound back to the user (two-way audio). As with any system described herein, this toy dispenser 50 may be wirelessly connected to any type of user transmitter/receiver and may utilize any release mechanism that is described above or below or is known from available prior art.

Figure 6:
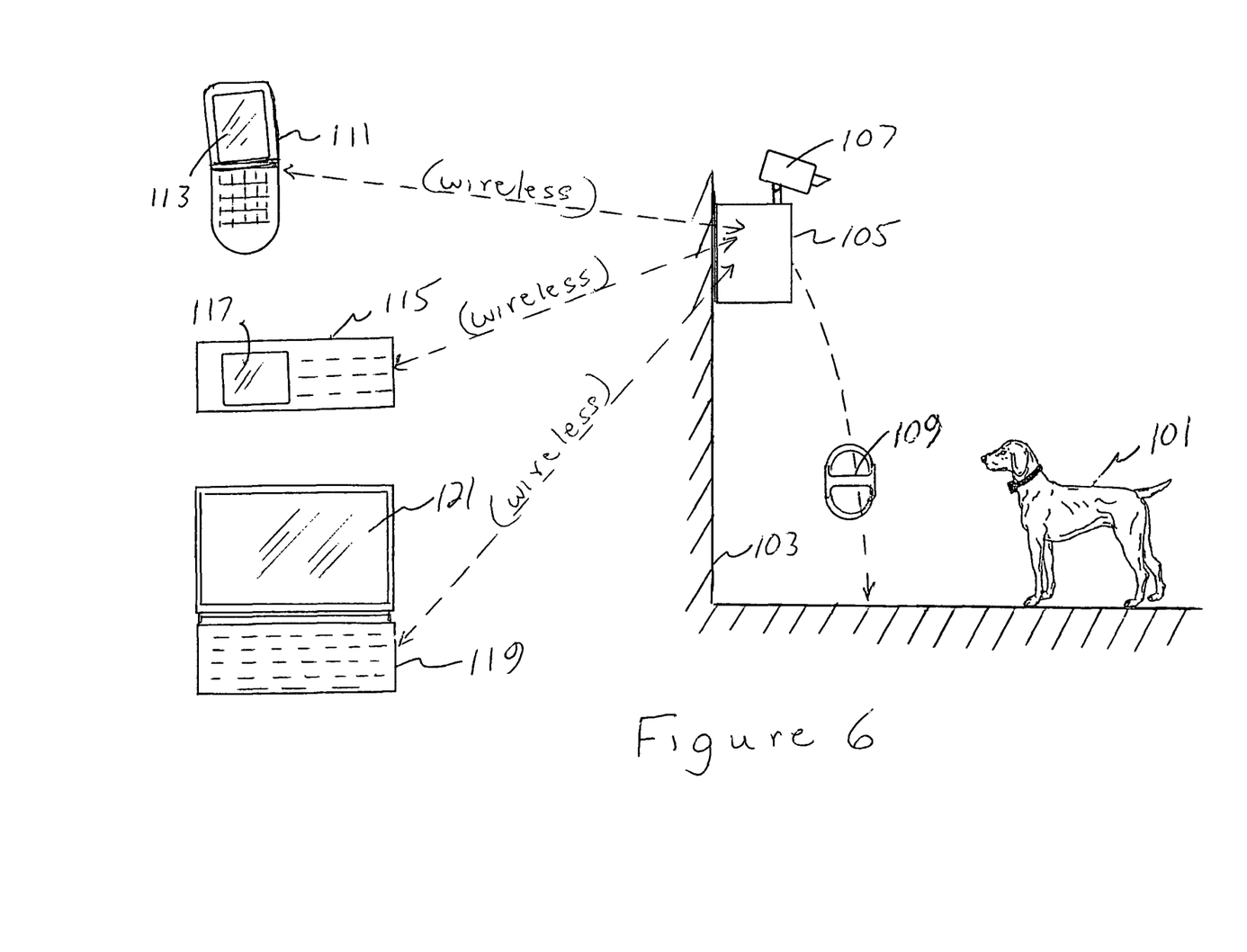
FIG. 6 illustrates a front view of another embodiment of a present invention wirelessly controlled pet toy dispenser with camera.

FIG. 6 illustrates a front view of another embodiment of a present invention wirelessly controlled pet toy dispenser with camera. Pet dog 101 is located in Room 103, for example, at home or at a pet hotel and pet dispenser main housing 105 is positioned above pet dog 101's reach level on a wall, as shown. Moveable camera 107 with a speaker and/or microphone is mounted for a user to remotely and wirelessly view the pet dog 101. Various transmitters/receivers may be utilized and three different types are shown as examples in this figure. Video capable cell phone 111 with screen 113 may be used to view pet dog 101 through moveable camera 107 to wirelessly release a pet toy at any desired time, such as pet toy 109. In the alternative, PDA 115 with screen 117 or laptop/notebook 119 with screen 121 may be utilized by a user in a similar fashion.

Figure 7:
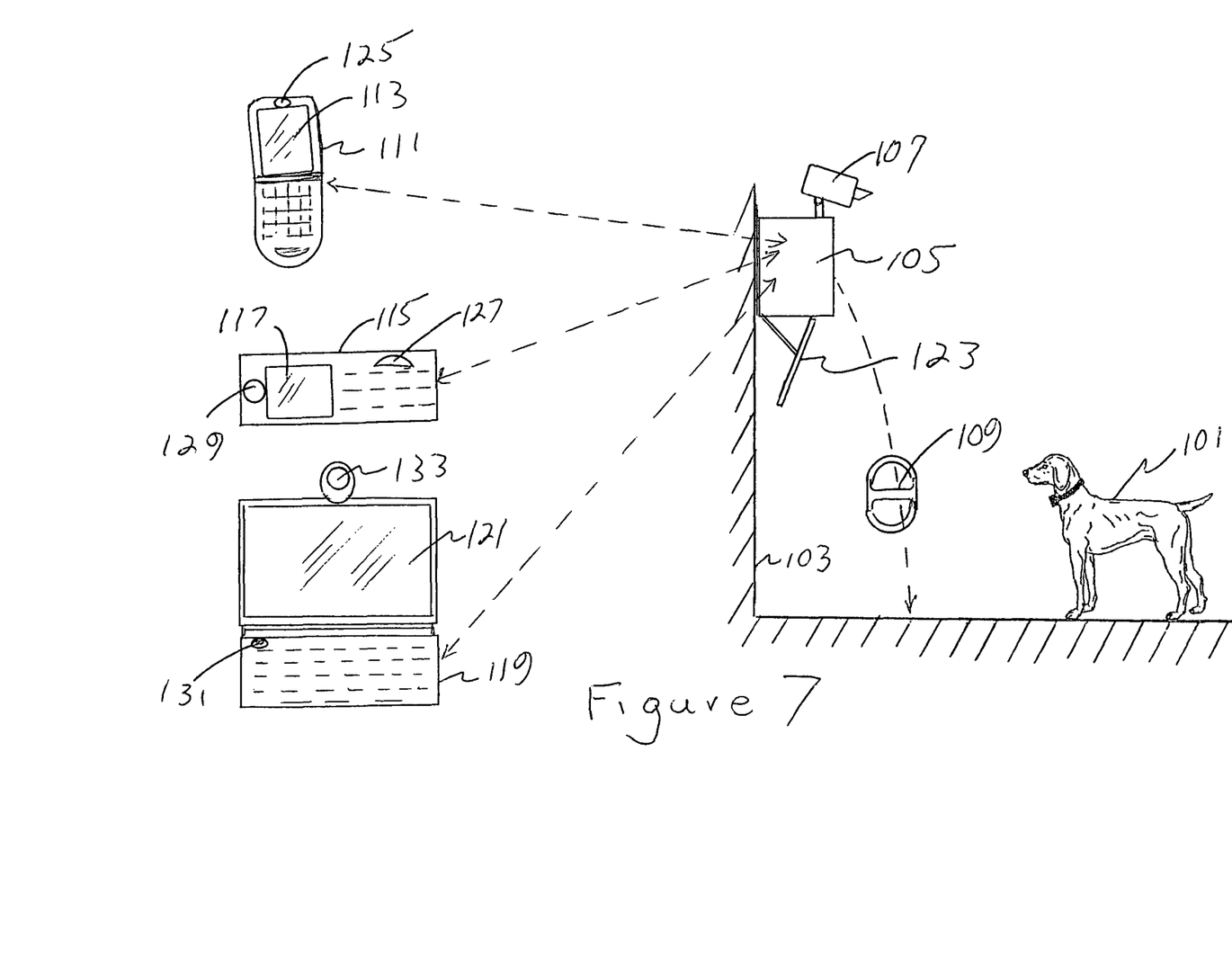
FIG. 7 is a bottom view of another embodiment of a present invention wirelessly controlled pet toy dispenser with camera.

FIG. 7 is a bottom view of another embodiment of a present invention wirelessly controlled pet toy dispenser with camera. Compartments identical to those shown in FIG. 6 above function here in identical fashion and are identically numbered. FIG. 7 differs from the FIG. 6 embodiment in that two-way video and two-way audio are provided. Hence, the display screen 123 is provided to pet dog 101 to enable it to view the use. Likewise, the system shown in room 103 will include both a microphone and a speaker. For example, the microphone will be built into camera 107 (as described above) and the speaker may be built into display screen 123. Correspondingly, cell phone 111 includes a camera 125 (and, as a cell phone, already has a microphone), PDA 115 has a camera 129 and a microphone 127, and a notebook/laptop 119 has camera 133 and microphone 131.

Figure 8:
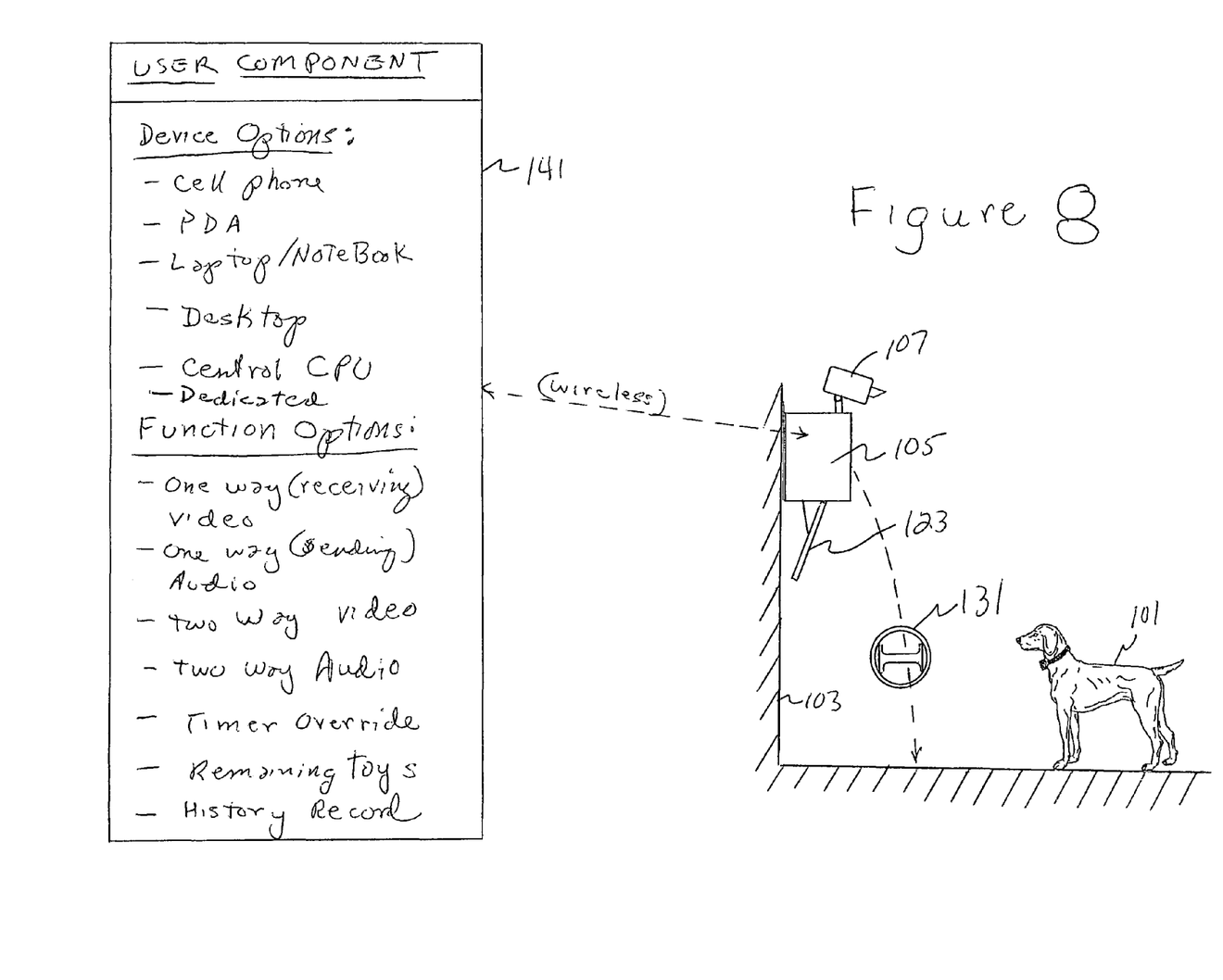
FIG. 8 is a front view of another embodiment of a present invention wirelessly controlled pet toy dispenser with camera with a diagrammatic representation of various user component options; and, FIG. 9 illustrates a front view of another embodiment of a present invention wirelessly controlled pet toy dispenser with camera with a diagrammatic representation of various pet component options.

FIG. 8 is a front view of another embodiment of a present invention wirelessly controlled pet toy dispenser with camera with a diagrammatic representation of various user component options. The right side of FIG. 8 is room 103 and has identical components to those shown in FIG. 7, with identical numbers and identical functionalities. Frame 141 contains a user component (transmitter/receiver) option. The device options include cell phone, PDA, laptop/notebook, desktop, central CPU and dedicated unit. The function options include one-way (receiving) video, one-way (sending) audio, two-way video, two-way audio, timer override, remaining toys and history record. The timer override feature would enable a user to set the system to release particular toys at preset (programmed in) times so that if a user were detained, such as at an extended business meeting or at a non-user friendly location., the pet could still be serviced in the absence of the user.

Figure 9:
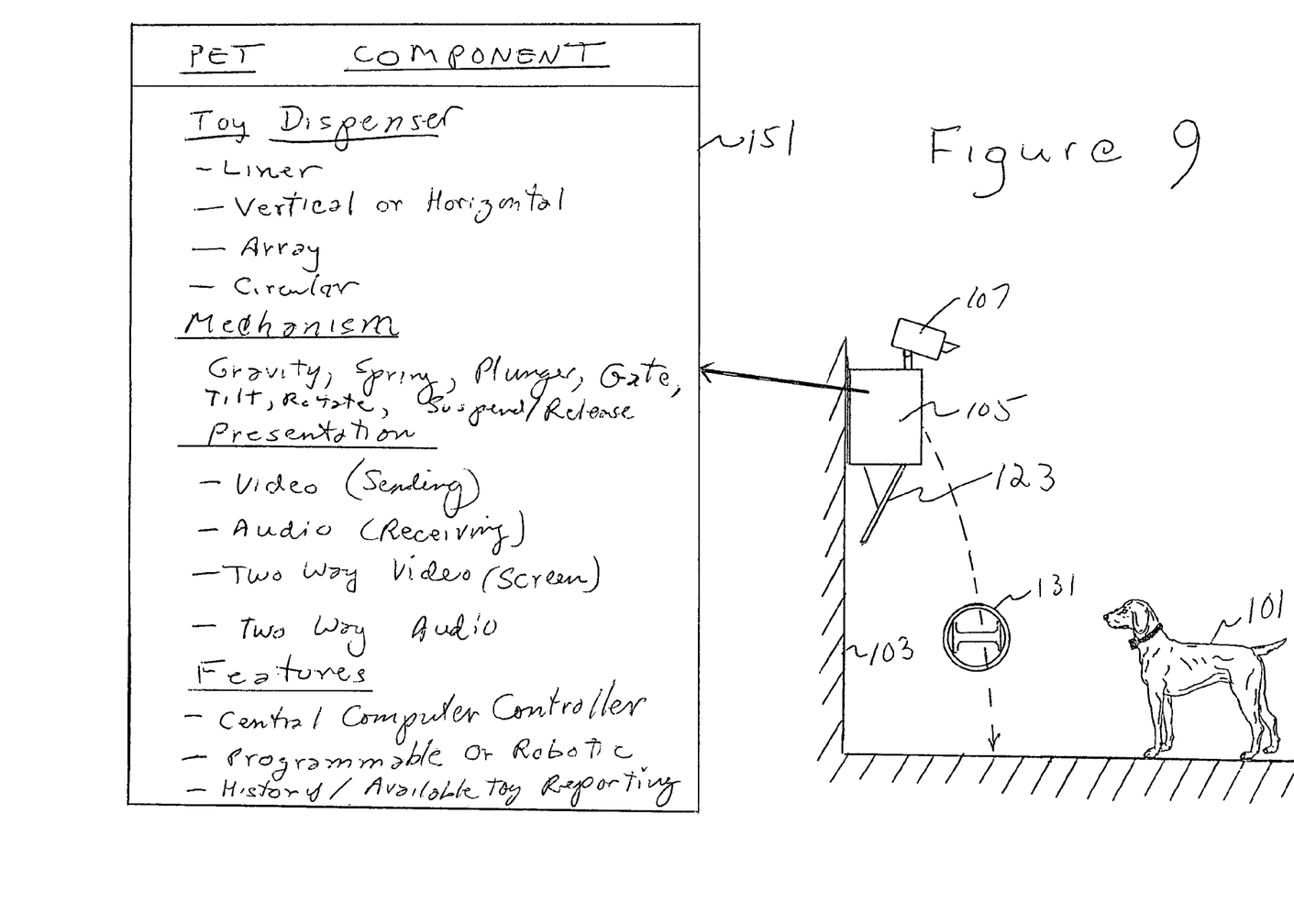

FIG. 9 illustrates a front view of another embodiment of a present invention wirelessly controlled pet toy dispenser with camera with a diagrammatic representation of various pet component options. The right side of FIG. 9 is room 103 and has identical components to those shown in FIG. 7, with identical numbers and identical functionalities. Frame 151 contains pet component (pet toy dispenser) option. The toy dispenser includes liner, vertical, horizontal, array, circular and other physical arrangements of the compartments. The release mechanism options include gravity, spring, plunger, gate, tilt, rotate and suspend/release, as well as any other available mechanisms. The presentation includes video (sending), audio (receiving), two-way video (screen) and two-way audio. The features include central/computer controller, programmable or robotic and history/available toy reporting.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims. For example, one or more unique signals to open the toy compartments could be one unique signal that initiates a mechanical or computer-controlled sequence of compartment openings, as in the case of a system that is programmed for a particular sequence and release times, or, for example, a mechanical releasing, e.g. a rotary main housing that moves compartments sequentially to an opening (user can select sequence by selecting toy positions in the device).

What is claimed is:

1. A wirelessly controlled pet toy dispenser system with camera, to provide a user with the opportunity to select a pet toy for dispensing and to select the timing of dispensing so as to create elements of surprise in the timing and toy selection for a pet, which comprises:
   a. a pet toy main housing having a plurality of compartments, each compartment adapted to hold at least one pet toy for subsequent dispensing, each compartment having a first state, being a pet toy holding state, and having a second state, being a pet toy dispensing state, said pet toy main housing being above a floor and positioned above the reach level of a pet for which it is intended, said dispensing state being a state causing movement of a pet toy from said main housing wherein a selected pet toy is therefore dropped to the floor;
   b. a movement mechanism connected to each of said plurality of compartments and adapted to independently move each of said plurality of compartments on separate command signals from said first position to said second position to dispense at least one pet toy;
   c. a control mechanism located at said main housing for receiving wireless signals, including at least one unique signal for each of said plurality of compartments to activate said movement mechanism, said control mechanism being functionally connected to said movement mechanism;
   d. at least one pet camera located at and connected to said main housing and camera transmission mechanism for wirelessly transmitting a camera picture to a remote user; and,
   e. a remote user transmitter and receiver, said transmitter keyed to said control mechanism and adapted to permit a remote user to select a compartment and activate at least one pet toy release at will, said receiver including camera picture screen keyed to said at least one pet camera.

2. The wirelessly controlled pet toy dispenser system with camera of claim 1 wherein said movement means are selected from the group consisting of (a) a latch opener with a gravity drop door; (b) a tilt mechanism; (c) a push mechanism.

3. The wirelessly controlled pet toy dispenser system with camera of claim 1 wherein said plurality of compartments is arranged with at least one row or column.

4. The wirelessly controlled pet toy dispenser system with camera of claim 1 wherein said remote user transmitter and receiver includes a microphone and said pet toy main housing includes a speaker in proximity thereto to enable a user to speak to a pet.

5. The wirelessly controlled pet toy dispenser system with camera of claim 1 wherein said plurality of compartments is arranged in at least one circle.

6. The wirelessly controlled pet toy dispenser system with camera of claim 1 wherein said remote user transmitter and receiver is a computer equipped with internet capability and picture viewing.

7. The wirelessly controlled pet toy dispenser system with camera of claim 1 wherein said remote user transmitter and receiver is a picture cell phone.

8. The wirelessly controlled pet toy dispenser system with camera of claim 1 wherein said control means is a wireless receiving and transmitting microprocessor.

9. The wirelessly controlled pet toy dispenser system with camera of claim 1 wherein said main housing includes wall attachment mechanism for attachment to a wall.

10. The wirelessly controlled pet toy dispenser system with camera of claim 1 wherein each of said plurality of compartments contains at least one pet toy and there are at least two different pet toys within said plurality of compartments.

11. A wirelessly controlled pet toy dispenser system with camera, to provide a user with opportunity to select a pet toy for dispensing and to select the timing of dispensing so as to create elements of surprise in the timing and toy selection for a pet, which comprises:
   a. a pet toy main housing having a plurality of compartments, each compartment adapted to hold at least one pet toy for subsequent dispensing, each compartment having a first state, being a pet toy holding state, and having a second state, being a pet toy dispensing state;
   b. movement mechanism connected to each of said plurality of compartments and adapted to independently move each of said plurality of compartments on separate command signals from said first position to said second position to dispense at least one pet toy;

c. control mechanism for receiving wireless signals, including at least one unique signal for each of said plurality of compartments to activate said movement mechanism, said control mechanism being functionally connected to said movement mechanism;

d. at least one pet camera connected to said main housing and camera transmission mechanism for wirelessly transmitting a camera picture to a remote user;

e. a remote user transmitter and receiver, said transmitter keyed to said control means and adapted to permit a remote user to select a compartment and activate at least one pet toy release at will, said receiver including camera picture screen keyed to said pet camera; and, f. at least one display screen, within proximity of said pet toy main housing to enable a pet to see a remote user.

12. The wirelessly controlled pet toy dispenser with camera of claim 11 wherein said movement mechanisms are selected from the group consisting of (a) a latch opener with a gravity drop door; (b) a tilt mechanism; (c) a push mechanism.

13. The wirelessly controlled pet toy dispenser with camera of claim 11 wherein said plurality of compartments is arranged with at least one row or column.

14. The wirelessly controlled pet toy dispenser with camera of claim 11 wherein said remote user transmitter and receiver includes a microphone and said pet toy main housing includes a speaker in proximity thereto to enable a user to speak to a pet.

15. The wirelessly controlled pet toy dispenser with camera of claim 11 wherein said plurality of compartments is arranged in at least one circle.

16. The wirelessly controlled pet toy dispenser with camera of claim 11 wherein said remote user transmitter and receiver is a computer equipped with internet capability and picture viewing.

17. The wirelessly controlled pet toy dispenser with camera of claim 11 wherein said remote user transmitter and receiver is a picture cell phone.

18. The wirelessly controlled pet toy dispenser with camera of claim 11 wherein said control means is a wireless receiving and transmitting microprocessor.

19. The wirelessly controlled pet toy dispenser with camera of claim 11 wherein said main housing includes wall attachment mechanism for attachment to a wall.

20. The wirelessly controlled pet toy dispenser with camera of claim 11 wherein each of said plurality of compartments contains at least one pet toy and there are at least two different pet toys within said plurality of compartments.

* * * * *